(12) United States Patent
Lange et al.

(10) Patent No.: US 10,846,345 B2
(45) Date of Patent: Nov. 24, 2020

(54) SYSTEMS, METHODS, AND SOFTWARE FOR IMPLEMENTING A NOTES SERVICE

(71) Applicant: Microsoft Technology Licensing, LLC, Redmond, WA (US)

(72) Inventors: Donovan Paul Lange, Kirkland, WA (US); Chad Erik Fowler, Redmond, WA (US); Ryan Levick, Berlin (DE); Itai Almog, Redmond, WA (US); Fan Zhong, Issaquah, WA (US); Keith Arthur Fournier, II, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 269 days.

(21) Appl. No.: 15/949,353

(22) Filed: Apr. 10, 2018

(65) Prior Publication Data
US 2019/0251183 A1    Aug. 15, 2019

Related U.S. Application Data

(60) Provisional application No. 62/628,863, filed on Feb. 9, 2018.

(51) Int. Cl.
*G06F 16/00* (2019.01)
*G06F 16/93* (2019.01)
(Continued)

(52) U.S. Cl.
CPC .......... *G06F 16/93* (2019.01); *G06F 16/2379* (2019.01); *G06F 16/245* (2019.01); *G06F 16/9024* (2019.01)

(58) Field of Classification Search
CPC .... G06F 16/93; G06F 16/245; G06F 16/2379; G06F 16/9024
(Continued)

(56) References Cited

U.S. PATENT DOCUMENTS 5,590,257 A * 12/1996 Forcier .................. G06F 40/10
715/273
5,596,350 A *  1/1997 Capps .................. G06F 40/103
345/173

(Continued)

FOREIGN PATENT DOCUMENTS

WO    2016209850 A1    12/2016
WO    2017078970 A1     5/2017

OTHER PUBLICATIONS

Moitra, et al., "Information Association: A new approach to personal information unification", Retrieved from: https://cs.unipaderborn.de/fileadmin/informatik/fg/mci/Masterarbeiten/2016/MA_Siddhartha_Moitra__Nitesh_Kumar_Singh.pdf, Aug. 31, 2016, 94 Pages.

(Continued)

*Primary Examiner* — Thanh-Ha Dang

(57) ABSTRACT

A notes service receives note items produced by various software applications. Each of the note items may comprise metadata, context data, and content representative of a note. The notes service, for each of the note items, stores a given note item in a note repository and updates a graph based at least on the metadata, the context data, and the content for the given note. As the notes service receives queries from the various software applications obtain relevant ones of the note items from the note repository, the service searches the graph for one or more note items relevant to a given query. The one or more notes are retrieved from the repository and provided in reply to the requesting application.

20 Claims, 7 Drawing Sheets

(51) Int. Cl.
*G06F 16/245* (2019.01)
*G06F 16/23* (2019.01)
*G06F 16/901* (2019.01)

(58) Field of Classification Search
USPC .......................................................... 707/741
See application file for complete search history.

(56) References Cited

U.S. PATENT DOCUMENTS

| | | | | |
|---|---|---|---|---|
| 5,613,019 | A * | 3/1997 | Altman | G06K 9/72 |
| | | | | 382/311 |
| 7,266,769 | B2 * | 9/2007 | Thacker | G06F 3/0481 |
| | | | | 707/999.104 |
| 7,616,333 | B2 * | 11/2009 | Wakeam | G06K 9/00402 |
| | | | | 358/1.11 |
| 8,817,712 | B2 * | 8/2014 | Shin | H04W 4/00 |
| | | | | 370/329 |
| 9,319,366 | B2 * | 4/2016 | Kim | H04W 4/14 |
| 2013/0147849 | A1 * | 6/2013 | Kwak | G06F 3/0485 |
| | | | | 345/666 |
| 2013/0325535 | A1 * | 12/2013 | Iqbal | G06Q 10/067 |
| | | | | 705/7.13 |
| 2014/0325407 | A1 * | 10/2014 | Morris | G06F 3/0481 |
| | | | | 715/765 |
| 2015/0248222 | A1 * | 9/2015 | Stickler | G06Q 30/02 |
| | | | | 715/763 |
| 2016/0124813 | A1 * | 5/2016 | Jain | G06F 40/169 |
| | | | | 707/684 |
| 2017/0060819 | A1 * | 3/2017 | Rucine | G06K 9/00402 |
| 2017/0060821 | A1 * | 3/2017 | Rucine | G06F 40/106 |
| 2017/0090692 | A1 * | 3/2017 | Kurita | G06F 3/04883 |
| 2017/0153806 | A1 * | 6/2017 | Rucine | G06F 3/017 |
| 2017/0199660 | A1 * | 7/2017 | Guiavarc'h | G06K 9/00429 |
| 2018/0011627 | A1 * | 1/2018 | Siracusano, Jr. | H04L 12/1813 |
| 2018/0052813 | A1 * | 2/2018 | Laupretre | H04L 65/403 |
| 2018/0217970 | A1 * | 8/2018 | Dev | G06F 3/04883 |
| 2018/0314882 | A1 * | 11/2018 | Yu | G06F 16/5866 |
| 2018/0348896 | A1 * | 12/2018 | Markiewicz | G06F 3/03545 |

OTHER PUBLICATIONS

"International Search Report and Written Opinion Issued in PCT Application No. PCT/US19/015494", dated Mar. 28, 2019, 12 Pages.

* cited by examiner

SYSTEMS, METHODS, AND SOFTWARE FOR IMPLEMENTING A NOTES SERVICE

RELATED APPLICATIONS

This application is related to, and claims the benefit of priority to, U.S. Provisional Application No. 62/628,863, filed on Feb. 9, 2018, and entitled SYSTEMS, METHODS, AND SOFTWARE FOR IMPLEMENTING A NOTES SERVICE, which is hereby incorporated by reference in its entirety.

TECHNICAL BACKGROUND

Digital note-taking applications have proliferated in recent years due to their increasing ease-of-use and practicality. Note taking applications allow users to take notes in the context of digital notebooks, which may be further segregated into pages and sections. Notes can sometimes be imported into and exported out of notebooks, shared amongst collaborators, and otherwise leveraged during the content creation process.

The digital note taking experience has generally existed outside of the content creation experience in which a user may create a document, spreadsheet, presentation, or the like. For example, to consult notes on a relevant subject, the user would need to switch from one application (e.g. a word processing application) to another (e.g. a note taking application) in order to read and view the notes, perhaps copying and pasting them into a document.

More recently, the ability to link notes to a given document has been developed. When editing a document in a word processing document, a user may launch a view of a page in a digital notebook from within the document experience. The page in the digital notebook can be populated with the notes and linked to the document such that, the next time the document is opened, the notes can be quickly accessed from the document.

OVERVIEW

Technology is disclosed herein for operating a notes service that allows users to create notes in any application that flow to the same or other applications. In this manner, a user may encounter a relevant note when working in one application that was created in the context of the same or another application.

In an implementation, the notes service receives note items produced by various software applications. Each of the note items may comprise metadata, context data, and content representative of a note. The notes service, for each of the note items, stores a given note item in a note repository and updates a graph based at least on the metadata, the context data, and the content for the given note.

As the notes service receives queries from the various software applications to obtain relevant ones of the note items from the note repository, the service searches the graph for one or more note items relevant to a given query. The one or more notes are retrieved from the repository and provided in reply to the requesting application.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
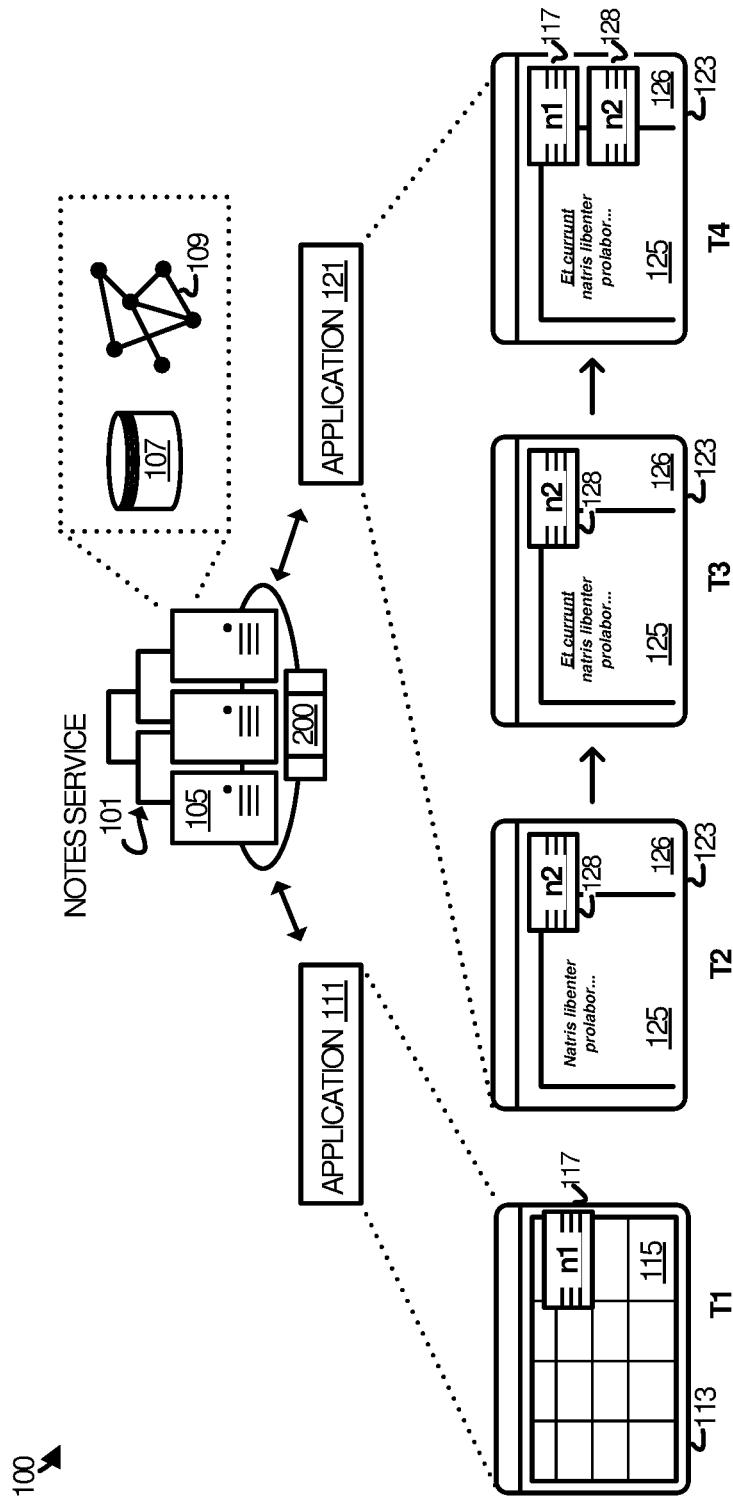
FIG. 1 illustrates an operational environment and an exemplary scenario in an implementation of a notes service.
Figure 2:
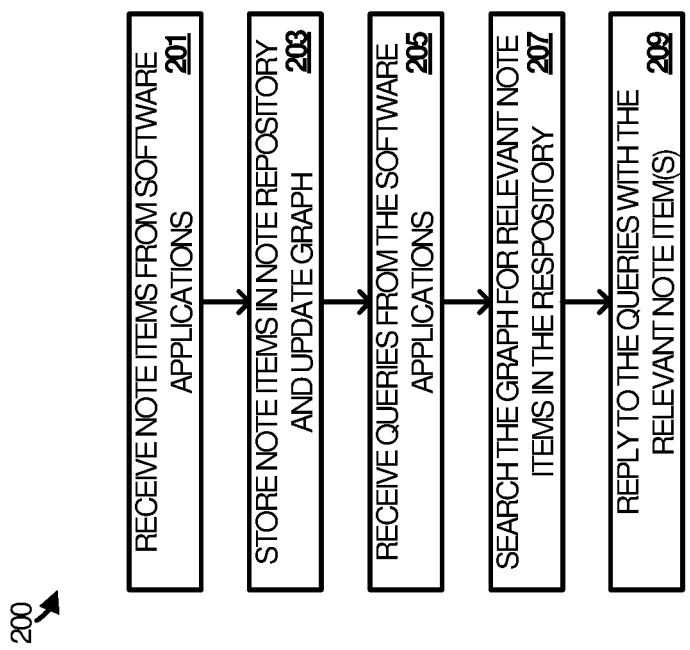
FIG. 2 illustrates a notes service process in an implementation.

Technology is disclosed herein for implementing a notes service that interacts with various applications in support of digital note taking. The notes service, which may be implemented on one or more server computers in the context of a data center, communicates with a variety of applications on end-user devices. The applications produce and send note items to the notes service to be stored in a repository and reflected in a graph. Both the repository and the graph may be maintained by the notes service, although such responsibilities may be offloaded to or shared with other services.

The note items may be implemented in the form of files, data streams, or other suitable data structures. The note items include content representative of a note, such as user-generated text, digital inking, web clippings, photos, recordings, or the like. The note items also include metadata indicative of their source, such as the identity of the application that created the note item, the time at which it was created, and the time at which it was updated.

Context data is also included in the note item. The context data may be indicative of the surrounding context when the note was created or edited, including for example a location of the given note item, an activity associated with the given note item, one or more people associated with the given note item, one or more other note items associated with the given note item, and a document associated with the given note item. For instance, the location information may specify a location where the note was created, a location listed in the note itself, or some other location. The activity information may specify an activity that was occurring at the time of the note creation (e.g. during a scheduled meeting), an activity expressed in the note content, or other such activities.

The notes service receives the note items from the software applications and stores each note item in a note repository. Notes may be stored in user-specific repositories, similar to email mailboxes, and in a format suitable to indexing and searching. Example formats include hyper-text mark-up language (HTML) blobs, although a variety of formats are possible and may be considered within the scope of the present disclosure. While the repositories may be user-specific, they may also be organized on a per-group or per-team basis or in some other manner.

In addition to storing the note items, the notes service updates a graph based on the metadata, the context data, and the content for the given note. The graph may be a data structure organized in terms of nodes and edges. The nodes may represent the note items and other entities, while the edges may represent relationships between the note items. Other examples of nodes include documents, messages, and people. Thus, the graph can be used to express relationships between and amongst the notes themselves, but also between and amongst the notes, documents, messages, and people.

In operation, the notes service receives queries from the software applications to obtain relevant ones of the notes to be surfaced to end-users. The queries may specify, for example, a local context associated with the application that sent a given query. Examples of the local context include, but are not limited to, the identity of the user, the identity of the application, an operational context of the query, a subject matter context, and an environmental context. The operational context may express the nature of the end-user's present operations (e.g. editing a document, preparing a presentation, or scheduling a meeting). The operational context may also identify other users with whom the user may be engaged at the time of the query (e.g. email recipients, chat recipients, document collaborators). The subject matter context may express keywords or topics with which the user is presently engaged—if any. The subject matter context may be derived from the email, document, or other such content creation item presently at the end-user's disposal. The environmental context may express, for example, the type of device being used, a location of the device, and the like.

The notes service parses the queries and searches the graph for one or more note items relevant to a given query. The search is performed using one or more pieces of metadata and contextual information included in the query. Having identified one or more relevant note items, the notes service replies to a given query with the items. The application on the receiving end of the reply may then surface one or more of the note items to the user.

In some implementations, the note items are supplemented with signal information. The notes service may then update the graph with the signal information. The signal information may be representative of, for example, other operations related to a given note item, a user, an application, or the like. For instance, an email application or service may supply signal information to the notes service indicative of emails being sent or received. A word processing application or service may supply signal information indicative of the state of a document, the location of a document, the shared status of a document, or any other such signal information. A calendar service may supply signal information indicative of meetings that have been scheduled. Even the act of querying for a relevant note, or reading a note, are events that generate signal information. Thus, the graph may be updated to reflect the new and changing relationships between the note items, messages, documents, people, and other nodes in the graph, in view of the data expressed in the signal information. The graph may also be updated to reflect that a query was submitted for a relevant note or that a note was obtained, opened, and read.

In this manner, a technical advance is achieved whereby relevant and timely notes may be surfaced to a user during the content creation experience or other such productivity situations. The notes may be created from within a given application, but surfaced in other applications, thereby mitigating the need for an end-user to switch between applications when creating and consuming notes. A fully integrated experience may even be provided that allows users to create, reference, and reuse notes in the form of "note cards" while they are working (meeting, documents, collaborative environment). The note cards are stored in a "notes fabric" which allows them to be reused seamlessly across applications.

Figure 7:
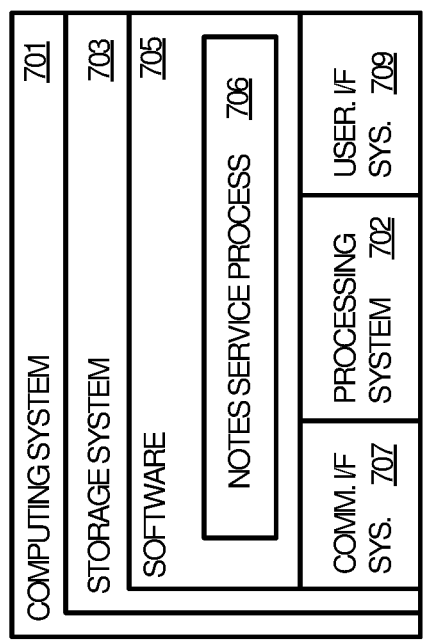
FIG. 7 illustrates a computing system suitable for implementing the notes technology disclosed herein, including any of the architectures, environments, elements, processes, and operational scenarios and sequences illustrated in the Figures and discussed below in the Technical Disclosure.

FIG. 1 illustrates an operational environment 100 in an implementation. Operational environment 100 includes a notes service 101 that provides notes capabilities to applications and/or services remote or distributed from it. Notes service 101 may be implemented as a stand-alone service or it may be integrated with other services of any type. Notes service 101 may be implemented in one or more data centers (physical or virtual), represented by data center 105, and on one or more computing systems, of which computing system 700 in FIG. 7 is representative.

Notes service 101 maintains a repository 107 in which note items received from applications may be stored and from which note items may be retrieved. Notes service 101 also maintains graph 109. Graph 109 is updated with information derived from the note items themselves, as well as signal information that may be received.

Application 111 and application 121 are illustrated in FIG. 1 as representative of the applications with which notes service 101 may interact. Examples of applications 111 and 121 include, but are not limited to, word processing applications, presentation applications, email applications, meeting applications, spreadsheet applications, note-taking applications, social networking applications, communication applications, gaming applications, browser applications, and any other suitable application, combination, or variation thereof. Each of application 111 and 121 may be implemented as a natively installed and executed application, a browser-based application, an applet, an add-in application, a streamed or streaming application, a mobile application, or any other type of software application. Applications 111 and 121 may be employed on a variety of devices, such as desktop computers, laptops, tablets, mobile phones, gaming devices, wearable devices, or any other suitable computing device, of which computing system 700 in FIG. 7 may be broadly representative.

Notes service process 200 may be employed in the context of handling incoming note items and queries. Notes service process 200 may be implemented in program instructions in the context of any of the software applications, modules, components, or other such programming elements that comprise notes service 101. The program instructions direct the underlying physical or virtual computing system or systems that provide the notes service to operate as follows.

Broadly speaking, notes service 101 first receives note items from application 111 and/or application 113 (step 201). Notes service 101 stores the note items in repository 107 and updates graph 109 (step 203).

Next, queries are received from application 111 and/or application 114 (step 205). Notes service 101 searches the graph 109 for note items that may be relevant to the queries (step 207). The relevant notes may then be returned to the requesting application in a reply to the queries (step 209). Notes service 101 may record that one or more of the relevant notes was returned in response to the queries. In addition, assuming one or more of the notes are opened and consumed, notes service 101 may record this fact in the graph.

In an operational scenario, application 111 renders a user interface 113 with which a user may interact to access the functions and features of the application. User interface 113 includes a content canvas 115 on which the user may create content, such as word processing documents, spreadsheets, presentations, calendar items, digital note books, or the like. In this scenario, the user creates a note item 117 (T1). The note item may include content generally representative of a note, such as a reminder, a comment, or the like. Application 111 (or another application proximate to it), uploads the note item 117 to notes service so that it may be indexed, stored, and reflected in the graph 109.

At a later time (T2), the same or a different user operating application 113 may create a second note in user interface 123. User interface 123 provides the user with access to the features and functionality of application 113 and, in this example, includes a content canvas 125 and a side-bar 126. The second note, represented by note 128, is surfaced in the user interface 123 and is also uploaded to notes service 101.

It may be appreciated that, subsequent to creating note 128, the user has edited the text on the content canvas (T3). Namely, text has been added to the original text. In the background, application 123 communicates a query to notes service 101 indicative of the local context of application 123. In this example, the local context includes subject matter context indicative of a key word derived from the text on the content canvas.

It may be assumed for exemplary purposes that the added text generated in application 113 relates to the content of the first note captured in note item 117. As such, when notes service 109 searches the repository 107 and graph 109 for relevant note items, note item 117 is returned as a possible candidate. Accordingly, note item 117 is returned to application 123 and may be surfaced in user interface 123.

Figure 3:
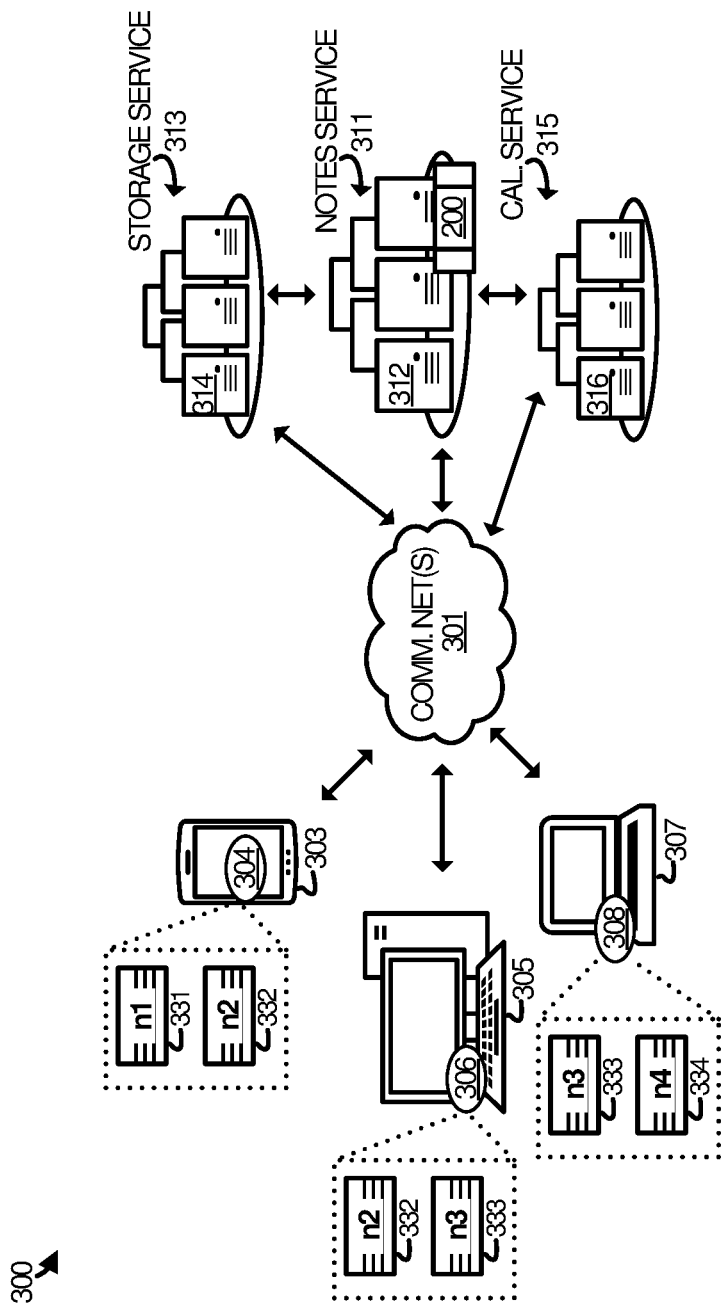
FIG. 3 illustrates another operational environment in an implementation.

FIG. 3 illustrates another operational environment in an implementation, represented by operational environment 300. Operational environment 300 includes a communication network 301 (or networks) over which devices 303, 305, and 307, with individual applications running on them respectively, communicate with various services. The services are represented by notes service 311, storage service 313, and calendar service 315, which may also communicate over communication network 301, although they may also communicate directly or over an internal/private network(s).

Each of devices 303, 305, and 307 is representative of any computing device on which an application suitable for communicating with notes service 311 may be run. Example devices include, but are not limited to, desktop computers, mobile phones, laptops, tablets, wearable devices, embedded devices, gaming devices, and any combination, variation, or alternative. Examples of suitable applications include, but are not limited to, word processing applications, note-taking applications, calendar applications, meeting applications, spreadsheet applications, presentation applications, gaming applications, social networking applications, messaging and communications applications, and any combination, variation, or alternative thereto. The applications in operational environment 300 include for exemplary purposes a word processing application 304, a meetings application 306, and a note-taking application 308.

Notes service 311 provides notes capabilities to applications and/or services remote or distributed from it. Notes service 311 may be implemented as a stand-alone service or it may be integrated with other services of any type (e.g. word processing service 313 and/or calendar service 315). Notes service 311 may be implemented in one or more data centers (physical or virtual), represented by data center 312, and on one or more computing systems, of which computing system 700 in FIG. 7 is representative.

Collaboration service 315 may store documents, notebooks, and other content items, and support collaboration on such content items. End-users may engage with the content items via a variety of applications, such as word processing application 304, meeting application 306, and note-taking application 308. Calendar service 317 provides various scheduling capabilities, schedule hosting, meeting coordination, and the like. Meeting application 306 may interact with calendar service 317 to retrieve schedules, send and receive meeting invites, and otherwise support user engagement with the service. Word processing application 304, meeting application 306, and note-taking application 308 may each be implemented as natively installed and executed applications, browser-based applications, mobile apps, or any combination, variation, or alternative thereto.

Each of word processing application 304, meeting application 306, and note-taking application 308 may support a note-card feature whereby a user can create a digital note from within their application experience. The note, in the format of a note item, may then be communicated by a given application to notes service 311. A given application may also query notes service 311 for notes relevant to a given context. Notes service 311 stores the notes in a repository and also indexes them in a graph. The graph includes data representative of edges and nodes which express the relationship between various notes, documents, messages, people, and other such entities.

Figure 4:
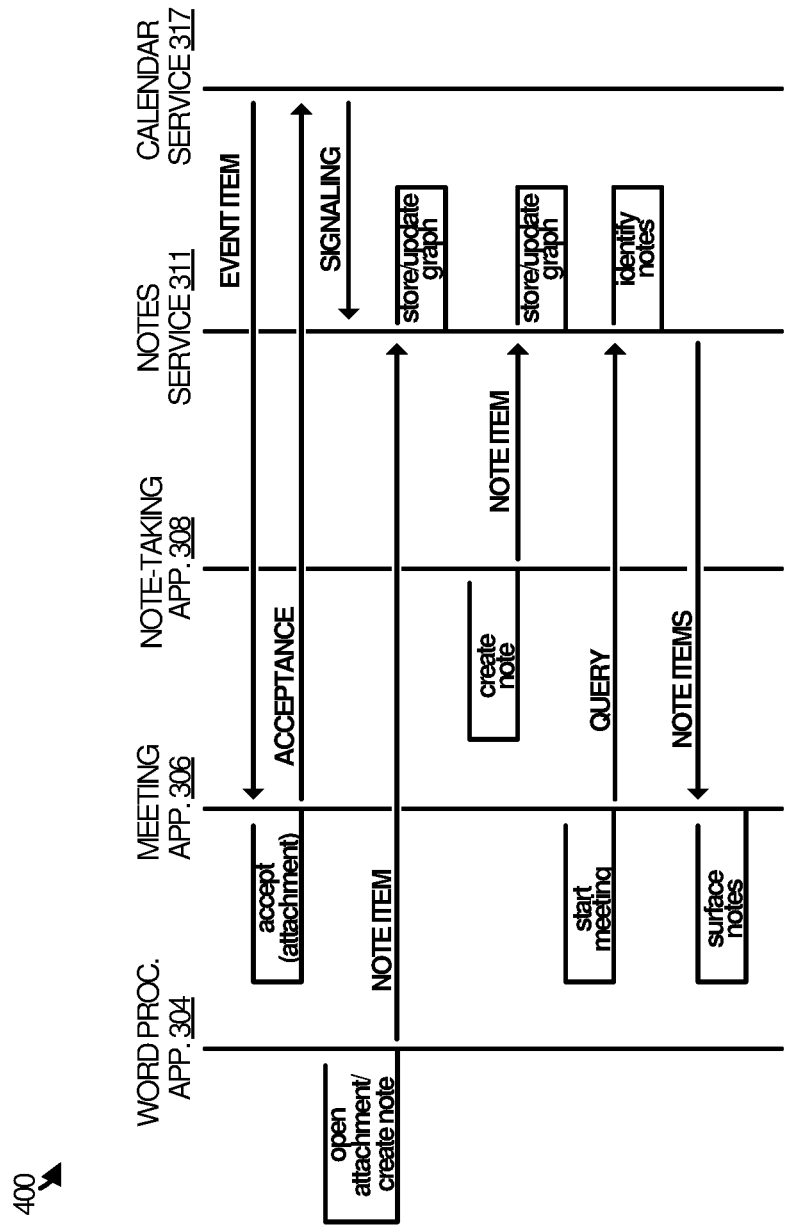
FIG. 4 illustrates an operational scenario in an implementation.

FIG. 4 illustrates one such operational scenario. In operational scenario 400, calendar service 317 sends an event item to meeting application 306. The event item may be, for example, an invitation to a conference call, online meeting, or the like, and includes an attachment. An end-user operating meeting application 306 accepts the invitation, which is reported to calendar service 317. Calendar service 317 (or meetings application 306) communicates signal information to notes service 311 indicating that the end-user was sent and accepted the invite—and that it included the attachment.

Subsequent to accepting the invite, the end-user operates word processing application 304 to open the document that was attached to the invite. The end-user creates a note from within the document experience, which is communicated as a note item to notes service 311. Notes service 311 stores the note item and updates the graph to reflect the existence of the note item, its relationship to the document, and therefore its relationship to the meeting invite.

Separately, the same end-user (or a different end-user) creates a note in note-taking application 308. This note is presumed for exemplary purposes to contain content similar to that of the note produced in word processing application 304. The note item is communicated to notes service 311, which stores the note item and updates the graph accordingly. At this point, the overlapping subject matter of the two note items results in their being linked in the graph by virtue of the subject matter (but possibly for other reasons, e.g. that both may have been created by the same end-user).

Subsequent to both note items being created, the meeting that was scheduled begins. Meeting application 306 submits a query to notes service 311 having local context data indicative of the meeting details and other such information. Notes service 311, having been alerted to the meeting and knowing from the graph that the document was originally attached to the invite, identifies the first note item as relevant to the query. However, as the first note item is linked to the second note item, both note items are considered as relevant to the query. Accordingly, both note items (and possibly more) are sent to meeting application 306. Meeting application 306 may then surface both notes in its user interface. In a brief illustration, the notes may be surfaced in a user experience within an online meeting.

Figure 5:
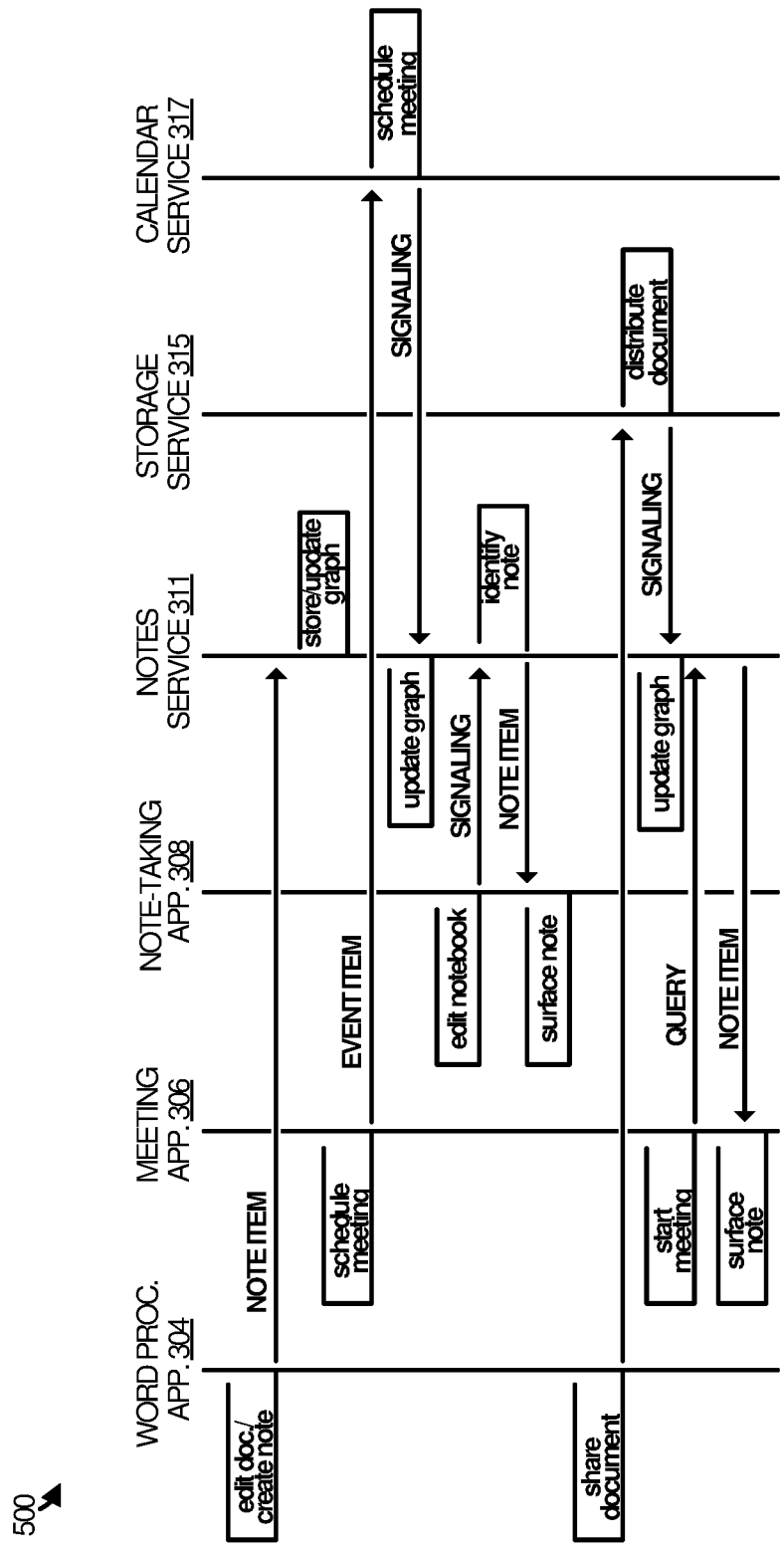
FIG. 5 illustrates an operational scenario in an implementation.

FIG. 5 illustrates another operational scenario pertaining to note creation and distribution as contemplated herein. In operational scenario 500, an end-user edits a document in word processing application 304. The user also creates a note while editing the document. The application communicates the note item to note service 311, to be stored in the repository and recorded in the graph.

Later on, the end-user schedules a meeting using meeting application 306. Meeting application 306 sends the event item to calendar service 317. Calendar service 317 responsively provides signal information to notes service 311 indicative of the meeting. At this point, no relationship exists in the graph between the document and the meeting or between the note item and the meeting.

Still later on, the end-user engages with note-taking application 308 to edit a notebook. The fact of his or her editing is communicated in signal information to notes service 311, which updates the graph accordingly. In addition, notes service 311 responsively identifies a note item that is relevant to the editing context in the note-taking application 311. Either in response to the signal information or in response to an explicit query by the application, notes service 311 supplies the note item to note-taking application 308. Note-taking application may then surface the note in a user interface.

The end-user also decides to share the document that he or she had been working on in word processing application 304. Word processing application 304 communicates with collaboration service 315 to affect the sharing. Storage service 315 shares or otherwise distributes the document to other users and also supplies signaling to notes service 311 indicative of the sharing. Notes service 311 responsively updates the graph to indicate that the document—which is linked to the first note—had been shared, as well is to indicate the collaborators with whom it was shared.

Once the meeting start-time arrives, meeting application 306 queries notes service 311 for any notes relevant to its context, meaning the context of the present meeting. The query may indicate the participants in the meeting, the presence of any attachments, and other useful contextual information. It is assumed for exemplary purposes that at least some of the participants in the meeting overlap with the collaborators on the shared document. Accordingly, notes service 311 identifies the document due to its relationship to the collaborators. In turn, notes service 311 identifies the note as related to the document. Notes service 311 therefore returns the note item to meeting application 306 to be surfaced in a user interface to the meeting. The content of the note item may be useful to the end-user during the duration of the meeting, for example.

Figure 6:
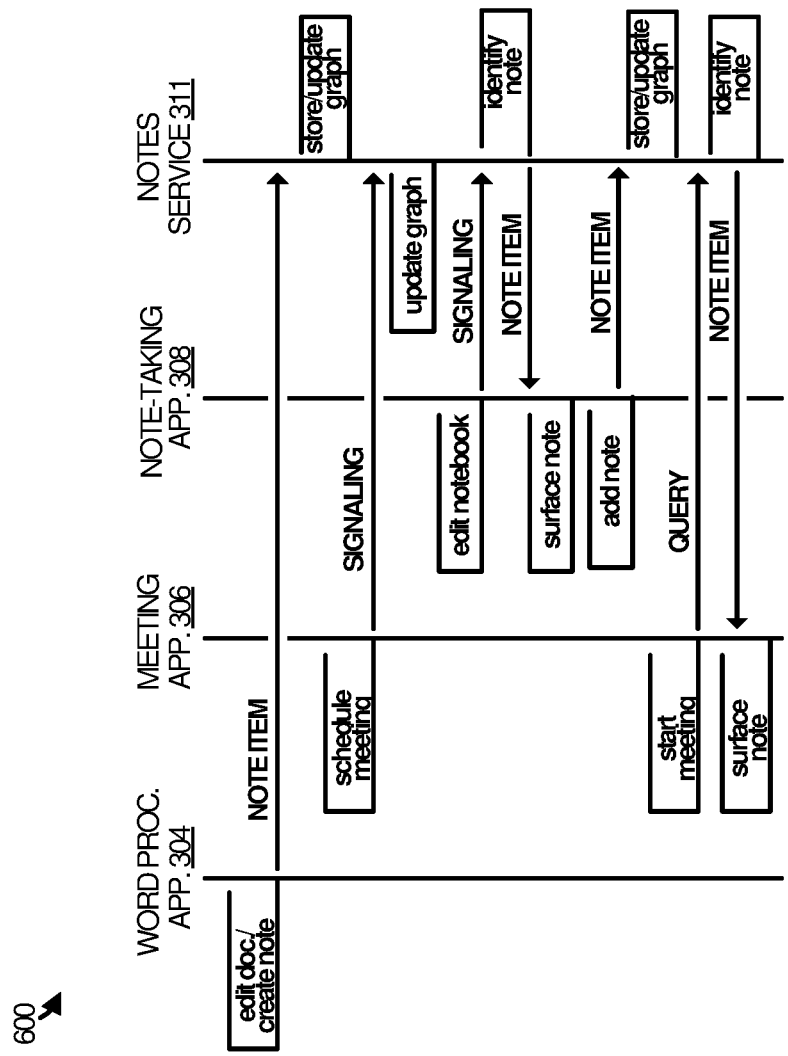
FIG. 6 illustrates an operational scenario in an implementation.

FIG. 6 illustrates an operational example in the absence of some of the services included in the preceding figures. In operational scenario 600, an end-user edits a document in word processing application 304. The user also creates a note while editing the document. The application communicates the note item to note service 311, to be stored and graphed.

Later on, the end-user schedules a meeting using meeting application 306. Meeting application 306 sends the event item to calendar service 317 and provides signal information to notes service 311 indicative of the meeting. At this point, no relationship exists in the graph between the document and the meeting or between the note item and the meeting.

Still later on, the end-user engages with note-taking application 308 to edit a notebook. The fact of his or her editing is communicated in signal information to notes service 311, which updates the graph accordingly. In addition, notes service 311 responsively identifies a note item that is relevant to the editing context in the note-taking application 311. Either in response to the signal information or in response to an explicit query by the application, notes service 311 supplies the note item to note-taking application 308. Note-taking application may then surface the note in a user interface.

The end-user then proceeds to create another note while using note-taking application 308. The other note may be related to the first note due to its subject matter, its proximity in time, due to user instructions to link them, or for various other reasons. The note item is uploaded to notes service 311, which in turn stores the note and updates the graph.

Once the meeting start-time arrives, meeting application 306 queries notes service 311 for any notes relevant to its present context. The query may indicate the subject of the meeting, for example, or other information against which notes service 311 can search. It is assumed for exemplary purposes that the subject of the meeting includes key words or phrases that relate to the content of the two notes. Accordingly, notes service 311 identifies the two notes and returns them in their note-item form to meeting application 306. Meeting application 306 is then able to surface the notes to the user at the start of the meeting.

FIG. 7 illustrates computing system 701, which is representative of any system or collection of systems in which the various applications, services, scenarios, and processes disclosed herein may be implemented. Examples of computing system 701 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709. Processing system 702 is operatively coupled with storage system 703, communication interface system 707, and user interface system 709.

Processing system 702 loads and executes software 705 from storage system 703. Software 705 includes number management process 706, which is representative of the processes discussed with respect to the preceding FIGS. 1-6, including notes service process 200. When executed by processing system 702, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device, but may also be distributed across multiple processing devices or sub-systems that cooperate in executing program instructions. Examples of processing system 702 include general purpose central processing units, graphical processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device, but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. For example, software 705 may include program instructions for implementing provisioning notes service process 200.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtual machine software, or other application software, in addition to or that include number management process 706. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system customized to process note items and respond to queries. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 709 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 709. In some cases, the input and output devices may be combined in a single device, such as a display capable of displaying images and receiving touch gestures. The aforementioned user input and output devices are well known in the art and need not be discussed at length here.

User interface system 709 may also include associated user interface software executable by processing system 702 in support of the various user input and output devices discussed above. Separately or in conjunction with each other and other hardware and software elements, the user interface software and user interface devices may support a graphical user interface, a natural user interface, or any other type of user interface.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A method of operating a notes service, the method comprising:
   receiving note items produced by digital notetaking in a plurality of software applications, wherein each of the note items comprises metadata, context data, and content representative of a note;
   for a given note item of the note items, storing the given note item in a note repository and updating a graph data structure based at least on the metadata, the context data, and the content for the given note item, wherein the graph data structure comprises nodes representing the metadata, the context data, and the content, and further comprises edges connecting the nodes;
   receiving a query from a software application of the plurality of software applications to obtain one or more relevant note items of the note items from the note repository; and
   in a response to the query:
   searching the graph data structure for an indication of one or more note items relevant to the query;
   retrieving the one or more note items relevant to the query from the note repository; and
   replying to the query with the one or more note items relevant to the query.

2. The method of claim 1 wherein searching the graph data structure for the indication of the one or more note items relevant to the query comprises searching the graph data structure based on a present context of a user experience associated with the query.

3. The method of claim 2 wherein the query includes additional context data that identifies the present context of the user experience.

4. The method of claim 1 further comprising receiving signal information associated with the note items and updating the graph data structure based on the signal information.

5. The method of claim 1 wherein context data for the given note item identifies at least one of a location of the given note item, an activity associated with the given note item, one or more people associated with the given note item, one or more other note items associated with the given note item, and a document associated with the given note item.

6. The method of claim 5 wherein the metadata for the given note item identifies at least a creation date and an updated date of the given note item.

7. The method of claim 6 wherein the content for the given note item is user-generated within a notebook of a notetaking application.

8. A computing apparatus comprising:
   one or more computer readable storage media;
   a processing system operatively coupled with the one or more computer readable storage media; and
   program instructions, stored on the one or more computer readable, for operating a notes service, wherein the program instructions, when read and executed by the processing system, direct the processing system to at least:
   receive note items produced by digital notetaking in a plurality of software applications, wherein each of the note items comprises metadata, context data, and content representative of a note;
   for a given note item of the note items, store the given note item in a note repository and update a graph data structure based at least on the metadata, the context data, and the content for the given note item, wherein the graph data structure comprises nodes representing the metadata, the context data, and the content, and further comprises edges connecting the nodes;
   receive a query from a software application of the plurality of software applications to obtain one or more relevant note items of the note items from the note repository; and
   in a response to the query:
   search the graph data structure for an indication of one or more note items relevant to the query;
   retrieve the one or more note items relevant to the query from the note repository; and
   reply to the query with the one or more note items relevant to the query.

9. The computing apparatus of claim 8 wherein to search the graph data structure for the indication of the one or more note items relevant to the query, the program instructions direct the processing system to search the graph data structure based on a present context of a user experience associated with the query.

10. The computing apparatus of claim 9 wherein the query includes additional context data that identifies the present context of the user experience.

11. The computing apparatus of claim 8 wherein the program instructions further direct the processing system to receive signal information associated with the note items and to update the graph data structure based on the signal information.

12. The computing apparatus of claim 8 wherein the context data for the given note item identifies at least one of a location of the given note item, an activity associated with the given note item, one or more people associated with the given note item, one or more other note items associated with the given note item, and a document associated with the given note item.

13. The computing apparatus of claim 12 wherein the metadata for the given note item identifies at least a creation date and an updated date of the given note item.

14. The computing apparatus of claim 13 wherein the content for the given note item is user-generated within a notebook of a notetaking application.

15. One or more computer readable storage media having program instructions stored thereon comprising a software application that, when read and executed by a processing system, direct the processing system to at least:
  receive note items produced by digital notetaking in a plurality of software applications, wherein each of the note items comprises metadata, context data, and content representative of a note;
  for a given note item of the note items, store the given note item in a note repository and update a graph data structure based at least on the metadata, the context data, and the content for the given note item, wherein the graph data structure comprises nodes representing the metadata, the context data, and the content, and further comprises edges connecting the nodes;
  receive a query from a software application of the plurality of software applications to obtain one or more relevant note items of the note items from the note repository; and
  in a response to the query:
    search the graph data structure for an indication of one or more note items relevant to the query;
    retrieve the one or more note items relevant to the query from the note repository; and
    reply to the query with the one or more note items relevant to the query.

16. The one or more computer readable storage media of claim 15 wherein the query includes additional context data that identifies a present context of a user experience.

17. The one or more computer readable storage media of claim 15 wherein the program instructions further direct the processing system to receive signal information associated with the note items and to update the graph data structure based on the signal information.

18. The one or more computer readable storage media of claim 15 wherein the context data for the given note item identifies at least one of a location of the given note item, an activity associated with the given note item, one or more people associated with the given note item, one or more other note items associated with the given note item, and a document associated with the given note item.

19. The one or more computer readable storage media of claim 18 wherein for the given note item, the metadata identifies at least a creation date and an updated date of the given note item.

20. The one or more computer readable storage media of claim 15 wherein the content for the given note item is user-generated and comprises an audio or video recording.

* * * * *